A. L. DOW.
MACHINE FOR COLD ROLLING DISKS.
APPLICATION FILED MAR. 31, 1909.

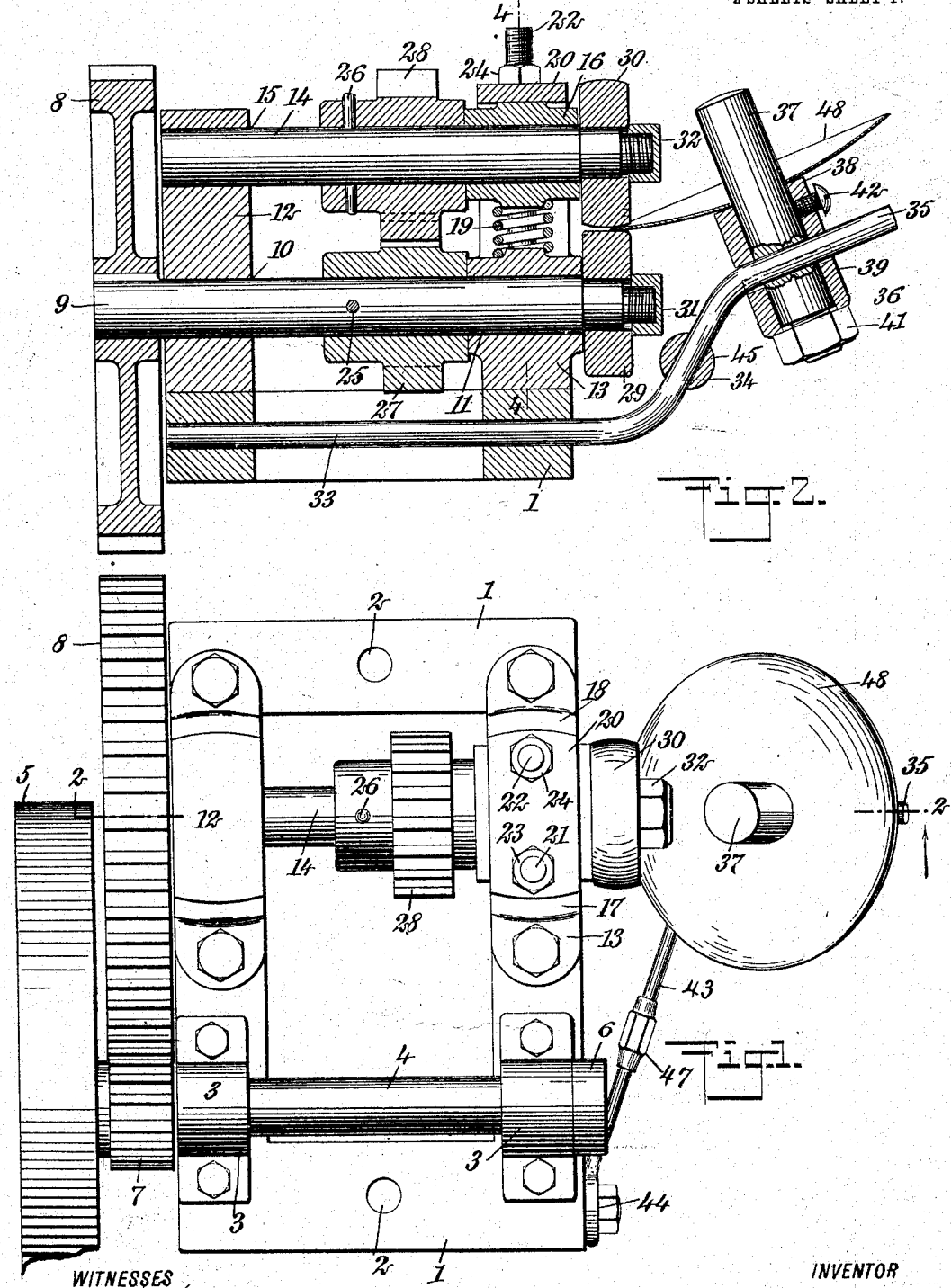

950,900.

Patented Mar. 1, 1910.
2 SHEETS—SHEET 2.

WITNESSES

INVENTOR
Abraham Lincoln Dow
BY
ATTORNEYS

UNITED STATES PATENT OFFICE.

ABRAHAM LINCOLN DOW, OF GROVER, COLORADO, ASSIGNOR TO HIMSELF, AND JOHN F. ALBRIGHT, OF DENVER, COLORADO.

MACHINE FOR COLD-ROLLING DISKS.

950,900.   Specification of Letters Patent.   Patented Mar. 1, 1910.

Application filed March 31, 1909. Serial No. 486,869.

*To all whom it may concern:*

Be it known that I, ABRAHAM LINCOLN DOW, a citizen of the United States, and a resident of Grover, in the county of Weld and State of Colorado, have invented a new and Improved Machine for Cold-Rolling Disks, of which the following is a full, clear, and exact description.

This invention relates to machines adapted to sharpen and roll disks used in plows, disk harrows, seeders, drills, and the like.

The object of the invention is to provide a device which is simple in construction and easily operated, and is of light weight so that it may be carried about from place to place. The device is also so constructed that it can be carried into the field and readily attached to an engine used to reciprocate a plow, to drive the same.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 3:
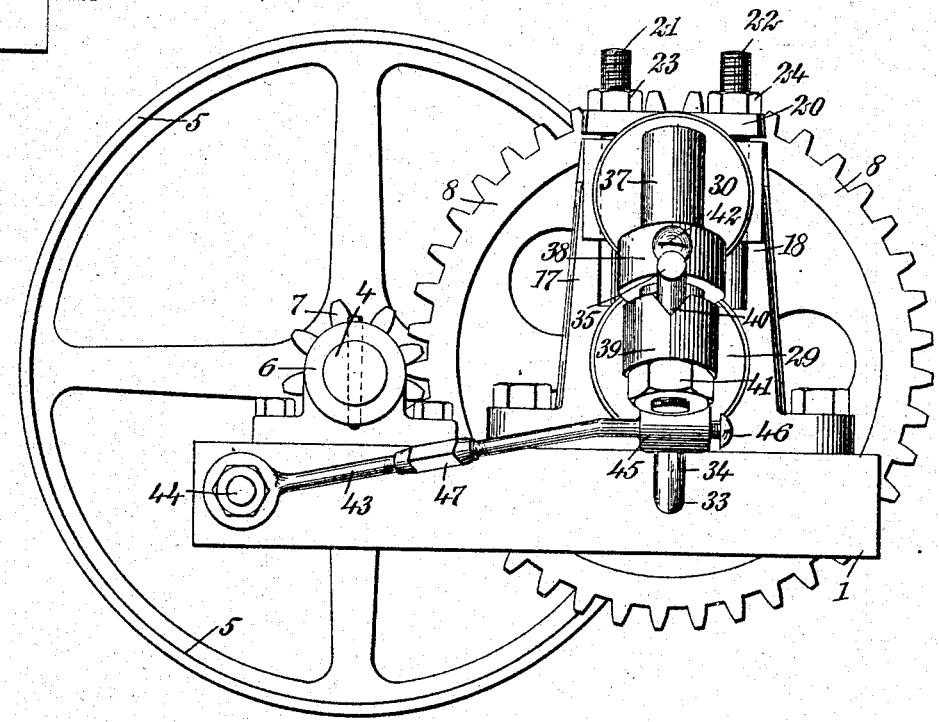
Figure 4:
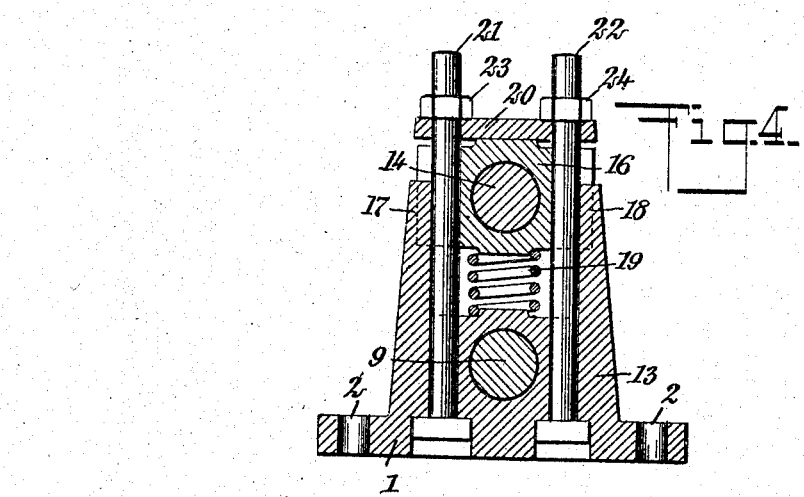

Figure 1 is a plan view of the device, a part being broken away; Fig. 2 is a vertical section on the line 2—2 in Fig. 1, looking in the direction of the arrow; Fig. 3 is an end view of the device in elevation, looking in the direction from right to left, in Fig. 2; and Fig. 4 is a section through the roller-supporting bearings, on the line 4—4 in Fig. 2.

Referring more particularly to the separate parts of the device, 1 indicates the base of the machine, which is adapted to be fastened in any suitable manner to a support. This base 1 has openings 2 therein, through which bolts may be passed to fasten it to a suitable support. On the base 1 are suitably secured bearings 3 for a shaft 4. This shaft 4 is the drive shaft, and is driven by any suitable motor means, such as a belt applied to a pulley 5. This shaft 4 is prevented from endwise movement in its bearings by means of a collar 6, suitably secured to the end thereof. Suitably secured on the drive-shaft 4, between the pulley 5 and one of the bearings 3, is a pinion 7. This pinion 7 engages a gear 8, which is suitably secured on a shaft 9 journaled in bearings 10 and 11 in the upright supports 12 and 13. These upright supports 12 and 13 are secured in any suitable manner to the base 1. Parallel with the shaft 9 and substantially vertically above it is a corresponding shaft 14. This shaft 14 has a bearing at one end in the upright 12, as shown at 15, and has also a floating bearing at the other end, which is designated as 16. This floating bearing 16 slidably engages the supporting upright 13, which has flanges 17 and 18 on either side thereof, which are adapted to guide the bearing. The floating bearing 16 rests on a spring 19, which is supported by the top of that portion of the supporting upright 13 which lies between the flanges 17 and 18. A cover plate 20 is adapted to rest on the upper surface of the bearing 16. This cover plate 20 has a pair of apertures therein, through which are adapted to pass bolts 21 and 22. These bolts 21 and 22 pass through openings in the base of the supporting upright 13 and are engaged by nuts 23 and 24 at their upper ends. These bolts 21 and 22 are thus adapted, by means of the nuts 23 and 24, to force the floating bearing 16 toward the upright 13, against the tension of the spring 19; thus the distance between the shafts 9 and 14 may be varied to an appreciable degree, the bearing 15 being made loose enough to allow for a limited amount of play.

Fixed on each of the shafts 9 and 14 by any suitable means, such as cotter-pins 25 and 26, are intermeshing gears 27 and 28. The gear 27 drives the gear 28; thus the shaft 14 is driven from the shaft 9. The shafts 9 and 14 are reduced at their outer ends, to receive sharpening rollers 29 and 30. The sharpening roller 30 is slightly crowned on its periphery, while the roller 29 is flat on its periphery with beveled edges so as to better receive the disk to be rolled and sharpened. The rollers 29 and 30 are held on to the shafts 9 and 14 by means of nuts 31 and 32. The nut 32 is right-handed and engages a right-hand thread on the shaft 14; the nut 31 is left-handed and engages a left-hand thread on the shaft 9. Thus the rotation of the rollers 29 and 30 tends to tighten the nuts 31 and 32 onto the shafts 9 and 14.

Rotatably supported in bearings in the base 1 is a bracket 33. This bracket 33 has an upwardly-extending portion 34, from which extends at an angle thereto another portion 35. This portion 35 is adapted to receive a work-supporting member 36. This work-supporting member 36 consists in a member 37 which has a transverse hole therein adapted to slide on the bracket portion 35. On either side of the bracket portion 35 and sliding onto the pin 37 are a pair of collars 38 and 39. The collar 39 has a pair of wedge-shaped slots 40 on opposite sides thereof. These wedge-shaped slots are adapted to engage the bracket portion 35 on its under side. The collar 39 is adapted to be forced against the under side of the bracket portion 35 by means of a nut 41, which engages a screw-thread on the lower end of the pin 37. The collar 38 is adapted to be adjustably fastened to the pin 37 by means of a set-screw 42. Thus the pin 37 may be fastened to the bracket portion 35 in any adjusted position thereon by means of the clamping action of the collars 38 and 39 on the bracket portion 35. The bracket 33, as mentioned above, is rotatable in its bearings. This permits an adjustment of the bracket portion 35 relative to the base 1. The bracket 33 is held in any adjusted position by means of a brace rod 43. This brace rod 43 is fastened at one end to the base 1 as at 44, by any suitable means, and fastened at the other end by means of a head 45 having an opening therein. This head 45 is secured to the bracket portion 34 by means of a set-screw 46. The brace 43 is divided intermediate its ends, and is joined by means of a double nut 47, which is adapted to engage right and left-hand threads on the two divided portions; thus the distance between the point of support 44 and the point where the head 45 engages the bracket portion 34, is varied by means of the nut 47, thereby adjusting the position of the work-support 36.

48 represents a disk taken from a disk-harrow, plow or the like. This disk 48 is shown as engaging the pin 37 on the work-support 36, and has a portion of its periphery placed between the rolling and sharpening rollers 29 and 30. These rollers 29 and 30 may be of any suitable material, but preferably of tool-steel. The disk 48 is adapted to be pressed between the rollers 29 and 30 and submitted to the cold rolling and sharpening action of the rollers.

The operation of the device is readily understood from the above description. The machine is adapted to be carried to the field where the plowing or harrowing operation is being carried on, and is also adapted to be fastened to the frame of a motor plow. The pulley 5 may then be connected in driving relation with the motor plow by means of a belt. The disks to be rolled and sharpened are to be secured on the work support 36 in an adjusted position suitable to their size and form. The rollers 29 and 30 are then rotated by means of the shafts 9 and 14, which are connected in driving relation by means of the gears 27 and 28. The shaft 29 is driven by means of the gear 6 and pinion 7 from the shaft 4, to which is fixed the belt-driven pulley 5.

Having thus described my invention, I claim as new and desire to secure by Letters Patent:—

1. In a device of the class described, the combination with a base, of upright supports on said base, a pair of shafts journaled on said uprights, one of said shafts having a floating bearing, driving connections between said shaft, sharpening rollers secured to said shafts, means for driving one of said shafts, a bracket supported on said base so as to permit of angular movement, means for adjusting and holding said bracket in adjusted position relative to said base, and a work-support adjustably secured to said bracket, said work support comprising a pin having an opening therein through which the bracket is adapted to extend, and a pair of collars adjustably secured in said pin, located upon opposite sides of the bracket and adapted to clamp said pin to said bracket.

2. In a device of the class described, the combination with a base, of a pair of shafts rotatably supported on said base, rollers secured to said shafts, means for driving said shafts, a bracket extending parallel to said shafts for a portion of its length, adjustably supported on said base, a turnbuckle brace connecting said bracket with said base, and a work support adjustably secured on said bracket.

3. In a device of the class described, the combination with a base, of a pair of shafts rotatably supported on said base, rollers secured to said shafts, means for driving said shafts, a bracket adjustably supported on said base and extending parallel to said shafts at one end and at a plurality of angles to said shafts at the other end, and a work-support adjustably secured on said brackets on said last-mentioned end, in juxtaposition to said rollers.

4. In a device of the class described, the combination with a base, of a pair of shafts rotatably supported on said base, rollers secured to said shafts, means for driving said shafts, a bracket adjustably supported in said base, extending parallel to said shafts at one end, and at an angle to said shafts at the other end, and a work support adjustably secured on said last-mentioned end.

In testimony whereof I have signed my name to this specification in the presence of two subscribing witnesses.

ABRAHAM LINCOLN DOW.

Witnesses:
J. F. ALBRIGHT,
C. C. COUDEN.